United States Patent Office 3,405,001
Patented Oct. 8, 1968

3,405,001
SOLID MATERIAL RENDERED ANTISTATIC
Ralph K. Iler, Wilmington, Del., assignor to E. I. du Pont de Nemours and Company, Wilmington, Del., a corporation of Delaware
No Drawing. Original application Nov. 13, 1962, Ser. No. 237,284, now abandoned. Divided and this application Aug. 26, 1964, Ser. No. 392,309
12 Claims. (Cl. 117—121)

ABSTRACT OF THE DISCLOSURE

A method of inhibiting the development of an electrostatic charge on solid materials such as textiles, paper, glass fibers, glass fabrics, glass staple, plastics, coated fiber glass, mica and the like which comprises depositing on said solid materials an hydrocarbyl onium salt of a tetraarylboron which results in a solid tetraarylboron coated material with a reduced propensity for the development of an electrostatic charge thereon.

CROSS-REFERENCE TO RELATED APPLICATIONS

This application is a divisional application of my co-pending application Ser. No. 237,284, filed Nov. 13, 1962, now abandoned.

This invention relates to novel ionic onium compounds. It is more particularly directed to the hydrocarbyl onium salts of a tetraarylboron, and to the use of these compounds to inhibit the development of electrostatic charges on materials susceptible to such charges.

The term "onium" is used here in its usual sense to denote a cation having the formula $(RXH_y)^+$, which is an isolog of ammonium and contains the element X in its highest positive valency. R in this formula is a hydrocarbyl radical.

The anionic portion of the molecule of the compounds can be an aryl-substituted boron.

Compounds preferred because of their effectiveness as antistatic agents and their ease of preparation are those of the formula

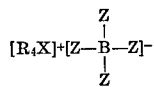

where
R is a hydrocarbyl radical;
X is nitrogen, phosphorus, or antimony; and
Z is an aryl radical containing 6 through 20 carbon atoms.

The term "hydrocarbyl" will include such radicals as alkyl, cycloalkyl, aryl and alkyl substituted aryls, all containing 6 through 40 carbon atoms.

The term "aryl" will include such radicals as phenyl, naphthyl, anthracyl, phenanthryl and diphenyl.

PREPARATION OF COMPOUNDS

The compounds of the invention are made by mixing, in stoichiometric proportions, 1–5% aqueous solutions of an appropriate water-soluble onium salt and an appropriate water-soluble salt of a tetraarylboron. The product precipitates spontaneously.

The resulting precipitate is filtered off, washed with water and dried. If higher purity is desired, the product can be recrystallized from such solvents as chloroform or ether.

In instances where the reactants are less soluble in water, warming may be required, or solvents such as acetone or methanol can be added to the solutions to aid in dissolving the reactants.

UTILITY

The compounds of the invention are useful as antistatic agents. When they are applied to the surface of a material susceptible to the development of an electrostatic charge, development of the charge is inhibited, or the charge is rapidly dissipated. This is achieved even at low humidities where ordinary antistatic agents are ineffective.

The compounds function in a way which is quite different from other antistatic agents in that they inhibit the development of an electrostatic charge initially, while ordinary antistatic agents now in use merely aid in the dissipation of the charge after it has been formed.

The compounds can be used to inhibit development of a static charge on any material susceptible to such a charge. For example, the compounds can inhibit electrostatic charges from developing on textiles (both natural and synthetic), paper, glass fibers, glass fabrics, glass staple, plastics, coated fiber glass, mica and the like.

The compounds are applied to the material to be treated by dissolving the compounds in a volatile solvent to give a concentration of a few tenths of one percent. Suitable solvents are acetone, trichloroethylene, toluene, methyl ethyl ketone, benzene and lower alcohols. The material to be treated is dipped into the solution, the excess solution is wrung out, and the material is dried.

The compounds can also be dissolved in water-immiscible solvents. These solutions are then emulsified in water and applied to the material to be treated.

The fact that the compounds can be applied as solutions suggests their application in the final rinse of a dry cleaning operation.

Alternatively, the compounds, as dry powders, can simply be rubbed or brushed onto the material to be treated. This material can then be heated so that the compound melts and spreads over its surface.

The mechanism of this antistatic phenomenon is not precisely understood. It is believed, however, that this behavior is linked in some way to the large interionic distances of the compounds.

Known ionic compounds are, generally speaking, composed of small anions and cations. For example, metal cations, even when they are hydrated, have ionic radii of less than 2.5 Angstrom units. The ammonium cation has an ionic radius of 1.24 Angstrom units. The ionic radius of the chloride anion is 1.8 Angstrom units and the sulfate anion has an ionic radius of only 2.29 Angstrom units. (Used in this sense, ionic radius is defined as the distance from the charged nucleus of the ion to its closest surface.) When such small anions and cations are combined to form ionic compounds, the charged nuclei can approach one another quite closely because of the small ionic radii.

The novel ionic compounds of this invention, however, have the charged nuclei of their anions and cations buried in the centers of large ionic units. The distances from the nuclei to the surfaces of the units are so large that they prevent the ions from closely approaching other similar anions and cations.

In the compounds of this invention, the charged nuclei are greater than 10 Angstrom units apart, and the compounds contain one anion-cation pair in 200 to 20,000 cubic Angstrom units. It is believed these large interionic distances confer antistatic properties upon the compounds, properties not possessed by similar ionic compounds having smaller interionic distances.

EXAMPLES

The following examples are presented to further illustrate the invention:

Example 1

A solution of tetra-n-hexylammonium iodide is prepared by dissolving one milligram-mole of the compound in 50 grams of a 1:1 mixture of isopropyl alcohol and water.

Similarly, a solution of sodium tetraphenylboron is prepared by dissolving one milligram-mole of the compound in 50 grams of a 1:1 mixture of isopropyl alcohol and water.

The two solutions are then mixed and heated at 80° C. until most of the isopropyl alcohol has evaporated. A white precipitate is formed in the solution during the evaporation of the alcohol. This is separated by filtration, washed with water and then with methanol and isopropyl alcohol.

The washed white powder which remains is dried under vacuum at about 60° C. for one hour, to give 0.62 gram of tetra-n-hexylammonium, tetraphenylboron having a melting point of 159–161° C. After recrystallization from a hot mixture of 80 parts by volume of benzene and 20 parts by volume of methanol, and drying, the product has a melting point of 164° C.

The compound has an interionic distance of 10 Angstrom units.

A 1% solution of this compound is prepared in a 1:1 mixture of trichloroethylene and cleaner's naphtha. Enough of the solution is applied to the surface of a nylon carpet with a sponge to wet the nap. The carpet is then dried.

After this treatment, the carpet does not develop an electrostatic charge when a person walks across it, whereas before treatment a high static charge invariably develops.

Example 2

A solution of 21.5 milligram-moles of sodium tetraphenylboron is prepared in 250 grams of a methanol-water mixture containing 40% by volume of methanol. Separately, 20 milligram-moles of tetra-n-heptylammonium iodide are dissolved in 600 grams of a methanol-water mixture containing 80% by volume of methanol.

The solution of sodium tetraphenylboron is added to the rapidly stirred solution of tetra-n-heptylammonium iodide, and the mixture is permitted to stand at room temperature for 16 hours. A white crystalline precipitate appears as soon as the solutions are mixed.

After standing for 16 hours, the precipitate is recovered by filtration, and is well washed with a water-methanol mixture containing 50% by volume of methanol. The product, a white powder, is dried under vacuum at 50° C. for 1.5 hours; 14.35 grams are obtained. After recrystallization from isopropyl alcohol, the product, tetra-n-heptylammonium, tetraphenylboron, melts sharply at 143° C.

The interionic distance of the compound is 10.8 Angstrom units.

This compound is dissolved in trichloroethylene to give a 0.5% solution. A sheet of polyvinylidene chloride film is dipped in the solution for one second, then removed and immediately drained. A slightly whitish residue remains on the film after it has dried.

The film can be rubbed vigorously with wool cloth without developing a static charge.

Example 3

Tetra-n-hexylphosphonium, tetraphenylboron is prepared in a manner similar to that described in Example 2 by reacting one gram-mole of tetra-n-hexylphosphonium bromide with one gram-mole of sodium tetraphenylboron.

In the solid state, the compound has an interionic distance greater than 10 Angstrom units.

Example 4

Tetra-n-heptylammonium, tetraanthrylboron is prepared in a manner similar to that set forth in Example 2 by reacting equimolar quantities of tetra-n-heptylammonium bromide with sodium tetraanthrylboron in a n-propanol–water mixture.

The solid product has an interionic distance greater than 10 Angstrom units.

Example 5

Tetra-n-hexadecylammonium tetraphenanthrylboron is prepared by reacting equimolar amounts of tetra-n-hexyldecylammonium iodide and sodium tetraphenanthrylboron. The reactants are separately suspended in acetone. These solutions are mixed and stirred until formation of sodium iodide is complete. The product is recovered by adding water to the reaction mixture, then filtering, drying, and recrystallizing the product from hot xylene.

In the solid state, the product has an interionic distance greater than 10 Angstrom units.

Example 6

Tetraphytylammonium, tetraphenylboron is prepared by reacting tetraphytylammonium bromide and sodium tetraphenylboron, in equimolar quantities, by suspending them in hot ethanol and stirring them until formation of sodium bromide is complete. Additional ethanol is added during the reaction to maintain a semifluid mixture.

The mixture is then diluted with water to complete precipitation. The solids are filtered off and purified by recrystallization.

The interionic distance of the solid product is greater than 10 Angstrom units.

Example 7

Tetra-n-octyltriacontylammonium, tetranaphthylboron is prepared by reacting equimolar quantities of tetra-n-octyltriacontylammonium bromide and sodium tetranaphthylboron, suspended in a mixture of equal volumes of dimethylformamide and xylene. As the reaction proceeds, more of the solids are added to maintain fluidity.

After the mixture has been stirred and heated until the formation of sodium bromide is complete, it is cooled to 60° C. and water is added to precipitate the product.

This material is collected, washed free of sodium chloride and purified by recrystallization.

The interionic distance of the product is greater than 20 Angstrom units.

Example 8

Tetranaphthylstibonium, tetranaphthylboron is prepared by suspending 0.11 gram-mole of sodium tetranaphthylboron in one liter of n-propanol. To this suspension is added an equal volume of a mixture of 0.10 gram-mole of tetranaphthylstibonium bromide in a 1:1, by volume, solution of propanol and water.

This mixture is stirred for several hours under reflux and water is then added gradually to precipitate the product.

In the solid state, the compound has an interionic distance of about 11 Angstrom units.

The compounds of Examples 3–8 can be used as antistatic agents in a manner similar to that described in Examples 1 and 2, with substantially equivalent results.

I claim:

1. A solid material, susceptible to the development of an electrostatic charge thereon, coated with an ionic salt having an anion and a cation, wherein said anion is an aryl-substituted boron anion and said cation is selected from the group consisting of nitrogen, phosphorous and antimony hydrocarbyl onium cations wherein the hydrocarbyl is selected from the group consisting of alkyl, cycloalkyl, aryl and alkyl substituted aryl, all containing from 6 through 40 carbon atoms, the charges of said anion and cation being surrounded by hydrocarbon radicals, said salts having an average interionic distance of greater than 10 Angstrom units and an average ionic concentration of one anion-cation pair in 200 to 20,000 cubic Angstrom units.

2. A solid material, susceptible to the development of an electrostatic charge thereon, coated with a hydrocarbyl onium salt of a tetraarylboron, the hydrocarbyl radicals containing 6 through 40 carbon atoms, and the aryl radicals containing 6 through 20 carbon atoms.

3. A solid material, susceptible to the development of an electrostatic charge thereon, coated with a compound of the formula

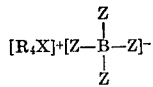

where
R is a hydrocarbyl radical containing 6 through 40 carbon atoms;
X is selected from the group consisting of nitrogen, phosphorus and antimony; and
Z is an aryl radical containing 6 through 20 carbon atoms.

4. A solid material, susceptible to the development of an electrostatic charge thereon, coated with a tetrahydrocarbylammonium salt of a tetraarylboron, the hydrocarbyl radicals containing 6 through 40 carbon atoms, and the aryl radicals containing 6 through 20 carbon atoms.

5. A solid material, susceptible to the development of an electrostatic charge thereon, coated with a tetrahydrocarbylphosphonium salt of a tetraarylboron, the hydrocarbyl radicals containing 6 through 40 carbon atoms, and the aryl radicals containing 6 through 20 carbon atoms.

6. A solid material, susceptible to the development of an electrostatic charge thereon, coated with a tetrahydrocarbylstibonium salt of a tetraarylboron, the hydrocarbyl radicals containing 6 through 40 carbon atoms, and the aryl radicals containing 6 through 20 carbon atoms.

7. A solid material, susceptible to the development of an electrostatic charge thereon, coated with a tetraalkylammonium salt of a tetraarylboron, said alkyl radicals containing 6 through 40 boron atoms and said aryl radicals containing 6 through 20 carbon atoms.

8. A solid material, susceptible to the development of an electrostatic charge thereon, coated with a tetraalkylphosphonium salt of a tetraarylboron, said alkyl radicals containing 6 through 40 carbon atoms and said aryl radicals containing 6 through 20 carbon atoms.

9. A solid material, susceptible to the development of an electrostatic charge thereon, coated with a tetraalkylstibonium salt of a tetraraylboron, said alkyl radicals containing 6 through 40 carbon atoms and said aryl radicals containing 6 through 20 carbon atoms.

10. A solid material, susceptible to the development of an electrostatic charge thereon, coated with a tetraalkylammonium salt of tetraphenylboron, said alkyl radicals containing 6 through 40 carbon atoms.

11. A solid material, susceptible to the development of an electrostatic charge thereon, coated with tetra-n-hexylammonium, tetraphenylboron.

12. A solid material, susceptible to the development of an electrostatic charge thereon, coated with tetra-n-heptylammonium, tetraphenylboron.

References Cited

UNITED STATES PATENTS

| | | | |
|---|---|---|---|
| 2,403,960 | 7/1946 | Stoops et al. | 117—139.5 |
| 2,730,464 | 1/1956 | Winsor | 117—139.5 |

OTHER REFERENCES

Wittig et al.: Acta Chem. Scand., vol. 7, pp. 1293–1301 (1953).
Wittig et al.: C.A., vol. 50, pp. 13731–13732 (1956).
Rabiant et al.: Bull. Soc. Chim. France, 5th series, vol. 24, pp. 798–800 (1957).
Crane: Anal. Chim. Acta, vol. 16, pp. 370–377 (1957).
Berns et al.: J.A.C.S., vol. 82, pp. 5585–5588 (1960).
Seyferth et al.: J.A.C.S., vol. 83, pp. 2055–2057 (1961).

WILLIAM D. MARTIN, *Primary Examiner.*

T. G. DAVIS, *Assistant Examiner.*